US010897423B2

United States Patent
Kommula et al.

(10) Patent No.: US 10,897,423 B2
(45) Date of Patent: Jan. 19, 2021

(54) CONGESTION AVOIDANCE IN A SLICE-BASED NETWORK

(71) Applicant: VMWARE, INC., Palo Alto, CA (US)

(72) Inventors: Raja Kommula, Cupertino, CA (US); Jeremy Tidemann, Urbana, IL (US); Constantine Polychronopoulos, Palo Alto, CA (US); Marc Andre Bordeleau, Shawinigan (CA); Edward Choh, Richmond (CA); Ojas Gupta, Mountain View, CA (US); Robert Kidd, Champaign, IL (US); Georgios Oikonomou, Patras (GR)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/411,888

(22) Filed: May 14, 2019

(65) Prior Publication Data

US 2020/0366611 A1    Nov. 19, 2020

(51) Int. Cl.
*H04L 12/24* (2006.01)
*G06F 9/455* (2018.01)
(Continued)

(52) U.S. Cl.
CPC ........ *H04L 47/122* (2013.01); *G06F 9/45558* (2013.01); *H04L 41/046* (2013.01);
(Continued)

(58) Field of Classification Search
CPC ......... H04L 29/08837; H04L 29/08846; H04L 49/70; G06F 2009/4557; G06F 9/455; G06F 9/45533; G06F 9/45558; H04W 84/18
See application file for complete search history.

(56) References Cited

U.S. PATENT DOCUMENTS 7,719,982 B2    5/2010   Varma
9,173,156 B2 *  10/2015  Bai ................. H04W 84/18
(Continued)

FOREIGN PATENT DOCUMENTS

CN    107277883 A     10/2017
CN    108540384       9/2018
(Continued)

OTHER PUBLICATIONS

International Search Report and Written Opinion, International Application No. PCT/US2020/014661, dated May 18, 2020.
(Continued)

*Primary Examiner* — Mohamed A Kamara
(74) *Attorney, Agent, or Firm* — Clayton, McKay & Bailey PC

(57) ABSTRACT

A system can reduce congestion in slice-based networks, such as a virtual service network ("VSN"). The system can include a monitoring module that communicates with agents on switches, such as routers or servers. The switches report telematics data to the monitoring module, which determines slice-specific performance attributes such as slice latency and slice throughput. These slice-specific performance attributes are compared against software license agreement ("SLA") requirements. When the SLA is not met, the monitoring module can implement a new slice path for the slice to reduce the congestion.

20 Claims, 10 Drawing Sheets

(51) Int. Cl.
*H04L 12/803* (2013.01)
*H04L 12/26* (2006.01)
*H04L 12/851* (2013.01)

(52) U.S. Cl.
CPC ...... *H04L 41/0896* (2013.01); *H04L 41/5009* (2013.01); *H04L 41/5019* (2013.01); *H04L 43/0852* (2013.01); *H04L 47/2425* (2013.01); *G06F 2009/4557* (2013.01); *G06F 2009/45595* (2013.01)

(56) References Cited

U.S. PATENT DOCUMENTS

| | | | |
|---|---|---|---|
| 9,722,935 | B2 | 8/2017 | Bouanen |
| 10,182,129 | B1 | 1/2019 | Peterson |
| 10,374,956 | B1 | 8/2019 | Tracy |
| 10,601,724 | B1 | 3/2020 | Filsfils |
| 2008/0075002 | A1 | 3/2008 | Fourcand |
| 2010/0074113 | A1 | 3/2010 | Muramoto |
| 2012/0281528 | A1 | 11/2012 | Hong |
| 2013/0282893 | A1 | 10/2013 | Pearce |
| 2015/0029853 | A1* | 1/2015 | Raindel ............... H04L 49/70 370/235 |
| 2015/0326448 | A1 | 11/2015 | Chaudhary |
| 2015/0326451 | A1 | 11/2015 | Rao |
| 2016/0048402 | A1 | 2/2016 | Tsirkin |
| 2016/0132798 | A1 | 5/2016 | Picard |
| 2016/0154660 | A1 | 6/2016 | Clark |
| 2016/0261495 | A1 | 9/2016 | Xia |
| 2016/0344565 | A1 | 11/2016 | Batz |
| 2016/0359872 | A1 | 12/2016 | Yadav |
| 2017/0214623 | A1 | 7/2017 | Finkelstein |
| 2017/0289270 | A1 | 10/2017 | Li |
| 2017/0346885 | A1 | 11/2017 | Jiang |
| 2018/0103091 | A1 | 4/2018 | Kwak |
| 2018/0131578 | A1 | 5/2018 | Cui |
| 2018/0131616 | A1 | 5/2018 | Laberge |
| 2018/0139129 | A1 | 5/2018 | Dowlatkhah |
| 2018/0152958 | A1 | 5/2018 | Arnold |
| 2018/0242161 | A1* | 8/2018 | Vulgarakis Feljan ....................... H04W 16/10 |
| 2018/0295180 | A1 | 10/2018 | Yang |
| 2018/0316608 | A1 | 11/2018 | Dowlatkhah |
| 2018/0316615 | A1* | 11/2018 | Shaw .................. H04L 41/0806 |
| 2018/0376338 | A1 | 12/2018 | Ashrafi |
| 2019/0014496 | A1 | 1/2019 | Kim |
| 2019/0028382 | A1 | 1/2019 | Kommula |
| 2019/0034220 | A1 | 1/2019 | Padmanabhan |
| 2019/0140904 | A1 | 5/2019 | Huang |
| 2019/0253962 | A1 | 8/2019 | Kiessling |
| 2019/0281466 | A1 | 9/2019 | Zhang |
| 2019/0319840 | A1* | 10/2019 | Cheng .................. H04W 64/00 |
| 2019/0394132 | A1 | 12/2019 | Zhang |
| 2020/0029242 | A1 | 1/2020 | Andrews |
| 2020/0068430 | A1* | 2/2020 | Chan .................. H04L 47/125 |
| 2020/0099625 | A1 | 3/2020 | Yigit |
| 2020/0128445 | A1 | 4/2020 | Dong |
| 2020/0186411 | A1 | 6/2020 | Ravichandran |
| 2020/0221346 | A1 | 7/2020 | Park |

FOREIGN PATENT DOCUMENTS

| | | |
|---|---|---|
| KR | 1020180009046 | 1/2018 |
| WO | WO2016049332 | 3/2016 |
| WO | WO2018214506 | 11/2018 |
| WO | WO2018224151 | 12/2018 |

OTHER PUBLICATIONS

Gouareb, Racha , "Virtual Network Functions Routing and Placement for Edge Cloud Latency Minimization", IEEE Journal on Selected Areas in Communications (vol. 36, Issue 10), sections I-V, Sep. 24, 2018.

Samsung: "Idle mobility aspects to support network slicing", 3GP Draft; R2-1708083 Idle Mobility Aspects to Support Network Slicing, 3rd Generation Partnership Project (3GPP), Mobile Competence Centre; 650, Route Des Lucioles; F-06921 Sophia-Antipolis Cedex, vol Ran WG2, No. Berlin, Germany Aug. 21, 2017-Aug. 25, 2017; Aug. 20, 2017.

International Search Report dated Jul. 16, 2020 for PCT/US2020/032769.

International Search Report dated Jul. 21, 2020 for PCT/US2020/032764.

International Search Report dated Jul. 22, 2020 for PCT/US2020/032768.

* cited by examiner

CONGESTION AVOIDANCE IN A SLICE-BASED NETWORK

BACKGROUND

Today's 3G, 4G, and LTE networks operate using multiple data centers ("DCs") that can be distributed across clouds. These networks are centrally managed by only a few operating support systems ("OSSs") and network operations centers ("NOCs"). 5G technology will dramatically increase network connectivity for all sorts of devices that will need to connect to the Telco network and share the physical network resources. Current network architectures cannot scale to meet these demands.

Network slicing is a form of virtualization that allows multiple logical networks to run on top of a shared physical network infrastructure. A distributed cloud network can share network resources with various slices to allow different users, called tenants, to multiplex over a single physical infrastructure. For example, Internet of Things ("IoT") devices, mobile broadband devices, and low-latency vehicular devices will all need to share the 5G network. These different use cases will have different transmission characteristics and requirements. For example, the IoT will typically have a large number of devices but very low throughput. Mobile broadband will be the opposite, with each device transmitting and receiving high bandwidth content. Network slicing can allow the physical network to be partitioned at an end-to-end level to group traffic, isolate tenant traffic, and configure network resources at a macro level.

However, traditional approaches to Quality of Service ("QoS") and congestion avoidance do not easily scale to keep up with the dramatic increase in network usage otherwise afforded by a slice-based network. For example, if there is congestion in the network, existing solutions throttle the source of congestion, effectively slowing data transmission to free up bandwidth. For example, existing flow control mechanisms, like Priority Flow Control ("PFC"), notify upstream switches (e.g., routers) about congestion and reduce it by throttling traffic at the source, such as a host that is sending traffic through the switches. But in a slice-based network, throttling can adversely affect other slices and inefficiently cause slices to perform more poorly than allowed under a software license agreement ("SLA"). New slice-based solutions that do not break SLA requirements are needed.

Important performance metrics, such as latency and throughput, are particularly challenging to accurately monitor in a slice-based network. In traditional networks, latency can be calculated in software by sending probe packets, such as a ping, between any two end points. However, software-based monitoring probes do not scale in large Telco networks that have tens of millions of users. Generally, detecting congestion in the virtual layer, such as with virtual network functions ("VNFs") of slices, is not scalable and would quickly overwhelm the underlying physical hardware.

Without additional ways to relieve congestion, when the network infrastructure becomes overburdened, important slices can be negatively impacted. SLAs often require reliable transmission of important traffic, such as 911 calls and communications to self-driving vehicles, among others.

As a result, a need exists for systems that relieve congestion in slice-based networks.

SUMMARY

Examples described herein include systems and methods for relieving congestion in slice-based networks. The system can include a monitoring module that communicates with agents on physical devices, such as routers or servers. The network can be divided into slices to accommodate different use cases for one or more tenants. Each slice can have required SLA performance attributes, such as threshold levels of latency, bandwidth, round-trip time, and others.

Each network slice in a virtual service network ("VSN") can carry data from multiple end devices, such as phones, cars, and IoT devices. For example, a 911 slice can carry calls from thousands of mobile devices at a time. The same case can exist with a YOUTUBE slice where hundreds of thousands of mobile users can watch YOUTUBE videos at the same time. Each slice can have different VNFs for different specialized functionality within the slice. However, monitoring some performance metrics with VNFs is not scalable.

In one example, some monitoring tasks are offloaded to the physical layer by running agents on the underlying switches. The agents can analyze traffic and report telematics data back to the monitoring module. In one example, the monitoring module can supply the agents to the switches, which can be programmable. In one example, the switches include programmable networking application-specific integrated circuits ("ASICs"), such as the TOFINO chip, that can be programmed using the P4 language or some other protocol.

Once programmed, the switches can then execute the agents in a physical layer rather than in a virtual layer. The agent on the switches can report telematics data to the monitoring module. The telematics data can be slice-specific, indicating some performance characteristic of a slice. Each switch can report telematics data for the slices it handles. The telematics data can be related to any performance metric for a slice, such as latency, bandwidth, and round-trip time.

The monitoring module can maintain or retrieve a network connectivity graph to track compiled telematics data for switches across the slice-based network. The monitoring module can also determine that a slice does not meet SLA requirements based on one or more switches in the network connectivity graph. This determination can be based on the telematics data across a slice path for that slice. The telematics data, also called performance data, can be compiled over time, such as averaged, and compared to SLA thresholds, in an example.

Based on the SLA not being met, the monitoring module can select an alternate slice path to reduce congestion. For example, the network connectivity graph can indicate another possible route with better performance metrics. The alternate slice path can include at least one switch that is not in the existing slice path for that slice. The monitoring module can implement the selected alternate slice path, causing the routing to change such that a first switch sends traffic to a third switch instead of a second switch in the original slice path. This can reduce congestion by distributing slice traffic throughout a network rather than simply routing all the slices down the same path.

In one example, the alternate slice path can be selected based on latency values falling below SLA requirements. For example, the monitoring module can receive packet timing information from multiple physical switches for multiple slices. Agents running in a physical domain of the switches can send the packet timing information. The monitoring module can determine a latency value based on the packet timing information, such as by averaging multiple different instances of the packet timing information received from the switches. Based on comparing the latency value to a threshold, the monitoring module can select an alternate slice path for a slice, the alternate path including a switch that is not in a current slice path for the slice. Then the monitoring module can implement the alternate slice path, which can include updating a switch with the new slice path so that the next hop is correct.

In one example, the alternate slice path can be selected based on throughput falling below SLA requirements. The monitoring module can receive data-rate information from the switches in a slice path of a first slice. The data-rate information can correspond to a slice identifier, allowing the monitoring module to correlate the data rate to a particular slice. The monitoring module can determine an aggregate throughput for a first slice based on the received data-rate information. Based on comparing the aggregate throughput to a threshold, the monitoring module can implement an alternate slice path for the first slice.

These stages can be performed by a monitoring module that executes as part of an orchestration system in some examples. Alternatively, a non-transitory, computer-readable medium including instructions can cause a processor to perform the stages when the processor executes the instructions. The term "switch" can broadly refer to any device performing network functionality, such as a server or router.

Both the foregoing general description and the following detailed description are exemplary and explanatory only and are not restrictive of the examples, as claimed.

DESCRIPTION OF THE EXAMPLES

Figure 1A:
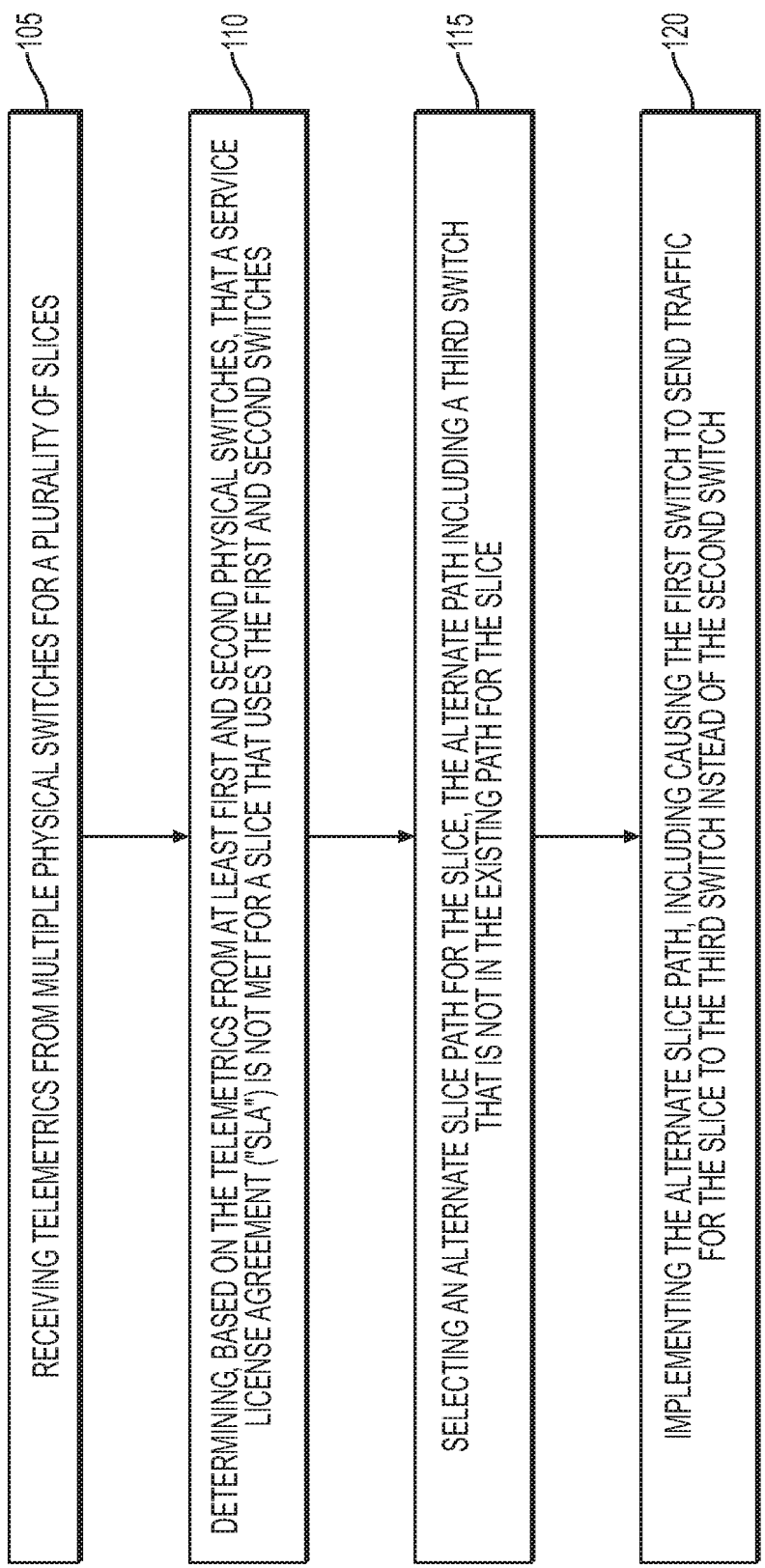
FIG. 1A is a flowchart of an example method for reducing congestion for a slice in a VSN.

Reference will now be made in detail to the present examples, including examples illustrated in the accompanying drawings. Wherever possible, the same reference numbers will be used throughout the drawings to refer to the same or like parts.

In one example, a system includes a monitoring module that receives telematics data, such as performance data related to latency or throughput, from multiple switches in a slice-based network. Agents executing in the physical layer on the switches can report the telematics data. The monitoring module can track performance over a network connectivity graph and determine when SLA requirements are not met for one or more slices.

Based on slice performance for switches in the network connectivity graph, the monitoring module can select a new slice path for a slice, bringing the slice back into SLA compliance. A slice can include elements in both the virtual overlay and physical underlay of the network and can potentially span multiple clouds. Slicing can allow a provider to segment a Telco network for use by multiple tenants, which can each have their own slices governed by SLA requirements.

The slices can span one or more clusters or clouds in a VSN. An orchestrator can manage multiple slices within the network, which can be used for specific purposes or leased to tenants. For example, the slices can be reserved for particular applications, IoT devices, or customers. Each slice can be a virtual network that runs on top of a shared physical network infrastructure distributed across one or more Telco clouds. A slice can include a service chain of VNFs for performing certain network tasks. The required combination of VNFs can differ based on the intended use of the slice, such as video streaming or IoT device management. Slices can be reserved for certain types of traffic and can be prioritized, such as for QoS purposes. An SLA can define which performance metrics are required for the slice and can specify required performance metrics for different slices. The performance metrics can vary depending on the intended use of a given slice. The SLA or a separate slice record can also specify which VNFs make up the service chain.

To instantiate the slice, the VNFs can be deployed across a slice path. The slice path can represent a subset of the provider's distributed network and can span one or more switches. Even when traffic is travelling to the same destination, different slices can route that traffic differently. The physical switches and VNFs can span different locations in the network, allowing slices to take different paths to the destination and effectively distributing workload across the network.

The physical switches can send the telematics data to a monitoring module. The monitoring module can be part of the orchestrator or a separate process. The orchestrator and monitoring module can be hosted on a management cluster of servers, in an example. In one example, the physical switches are programmed to execute an agent that monitors packets at the hardware level. For example, the agent can run in the core of the switch rather than in a virtual layer where the VNFs execute. The agent can cause the switch to route traffic based on the slices. The agent can also report the telematics data to the monitoring module. In one example, the switches can use programmable networking ASICs, such as the Tofino chip, that can be programmed using the P4 language or some other protocol. The monitoring module can program the switches to use the agent, in an example.

The monitoring module can ensure that the network is functioning as expected for the various slices. The monitoring module can also provide the switches with slice paths that allow the switches to send the packets to different next hops, based on the slice. The next hop can be another switch for the slice path. This allows for prioritized slices to be configured across less congested routes in the network. Based on packet prioritization within the switches and in slice path selection across the network, congestion can be reduced.

FIG. 1 is an example method with stages performed by a monitoring module. At stage 105, the monitoring module can receive slice-specific telematics data from multiple physical switches. The telematics data can be any performance data relating to slices that are routed to the switches. In one example, the switches can be programmed to execute an agent that communicates with the monitoring module. The agent can periodically report slice-specific telematics data or can be polled periodically by the monitoring module. The telematics data can include performance attributes such as switch latency, slice latency, total round-trip time, slice bandwidth, and switch bandwidth.

At stage 110, the monitoring module can determine if performance fails to meet an SLA requirement for a slice. A tenant of the service provider can negotiation and pay for specific performance requirements, which can be outlined in the SLA. The service provider needs to ensure that these SLA requirements are met, particularly since they can form the basis of the contractual relationship with the tenant.

To ensure SLA requirements are met, the monitoring module can aggregate telematics data for each slice and then compare the data against slice-specific SLA requirements, in an example. The telematics data can include a slice identifier in an example, allowing the monitoring module to perform a per-slice analysis. The monitoring module can also maintain a graph of switches in the physical layer that correspond to the slices, in an example. This can allow the monitoring module to determine which telematics data to use in determining performance of a slice.

As an example, a first slice can have latency and bandwidth SLA requirements. The monitoring module can collect performance metrics from the switches pertaining to the first slice and the metrics can relate to latency, bandwidth, or both. The monitoring module can determine that the SLA is not met when these performance metrics stay below SLA requirements for a period of time.

As a result, at stage 115, the monitoring module can select an alternate slice path for the slice. The alternate slice path can include a new path through the physical layer, such as a new switch that is not part of the existing slice path. The monitoring module can select the alternate slice path based on the network connectivity graph. This graph can include telematics data for other switches, indicating more favorable performance in relation to the SLA requirements that the slice does not currently meet. For example, telematics data from the new switch can indicate that latency and bandwidth will improve if the slice is routed to the new switch rather than an existing switch in the slice path.

At stage 120, the monitoring module can implement the alternate slice path. This can include sending a message to the first switch to update slice path information at the first switch. Whereas the original slice path information could indicate a second switch for the next hop of the slice, the updated slice path information can indicate the third switch as the next hop. Additionally, the monitoring module or some other orchestration process can instantiate one or more VNFs at the third switch if needed. Since the slice can operate in both the physical and virtual layers, the monitoring module can coordinate switching the slice path in the physical layer with VNF availability in the virtual layer.

By changing the slice path, network congestion can be decreased. The monitoring module can help distribute slices over available portions of the physical network. The switches used can span one or more clusters or clouds, reducing the load on overburdened switches.

Figure 1B:
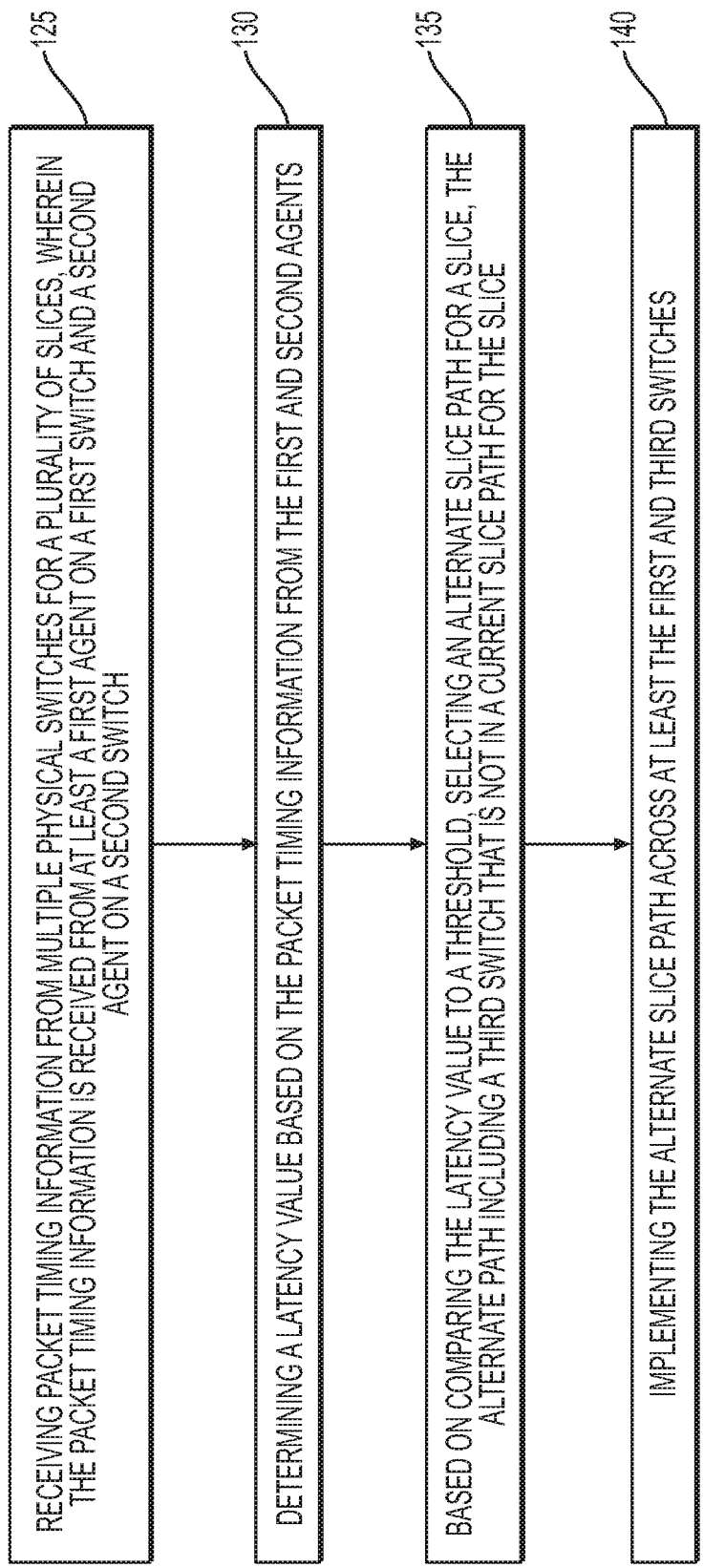
FIG. 1 is a flowchart of an example method for reducing congestion based on slice latency in a VSN.
FIG. 1C is a flowchart of an example method for reducing congestion based on slice throughput in a VSN.

FIG. 1B illustrates an example method for reducing congestion based on latency requirements. Latency can be an important SLA requirement for many types of customers. For example, a slice for 911 calls needs to have the lowest possible latency. If the monitoring module detects high latency times for the slice, it can analyze the VSN topology and calculate an alternate low-latency path, in an example.

At stage 125, the monitoring module can receive packet timing information from multiple switches. The packet timing information can be slice-specific. In one example, the timing information is a time stamp collected by the agent at the time a packet makes a hop. In one example, the switch can track request-response times for a packet at wire speed. A packet can be tracked across multiple switches, with timing information being reported by each for use in determining latency.

Table 1, below, indicates example types of requests and responses for different packet types.

TABLE 1

| Type | Request | Response |
| --- | --- | --- |
| ICMP | ICMP Echo Request | ICMP Echo Response |
| ARP | ARP Request | ARP Response |
| TCP | TCP Sequence Number | TCP Ack |

Internet control message protocol ("ICMP") and address resolution protocol ("ARP") packets can be tracked based on the protocol headers. In one example, to track transmission control protocol ("TCP") packets, the switches can set a flag, such as an urgent flag, in a packet and track acknowledgements from that packet.

Each switch can determine timing information for the various unique flows that correspond to the different slices. For example, a slice can have multiple different ingress points for different flows. YOUTUBE traffic can join the slice in both San Francisco and Miami, for example, resulting in two distinct flows. The flows can be determined based on packet headers. For example, a packet header can include a source internet protocol ("IP") address, a destination IP address, a source port, and a destination port. Using this information, the switch can identify a unique flow corresponding to a slice. When a packet is tracked for the flow, the timing information reported from each switch can be used by the monitoring module for determining latency.

The pseudo code of Table 2, below, is one example of how an agent on a switch can determine timing information for a packet.

TABLE 2

Example Pseudo Code for Packet Timing Information

```
foreach packet P
  if protoType(P) == ICMP
    if isRequest(P)
      Store sliceId, sip, dip, current time
    else
      Update RTT for sliceId, sip, dip
    endif
  elseif protoType(P) == ARP
    if isRequest(P)
      Store sliceId, smac, current time
    else
      Update RTT for smac, dmac
    endif
  elseif protoType(P) == TCP
    forFlow = getFlow(P->sip, P->dip, P->sport, P->dport)
    if forFlow is valid
      rtt = getTime( ) - forFlow->timeStamp
      updateSliceRtt(sliceId, rtt)
      cleanup forFlow
    elseif
      if P->flags & (URG || SYN || PSH) != 0
        revFlow = createFlow(P->dip, P->sip, P->dport, P->sport)
        revFlow->timeStamp = getTime( )
```

TABLE 2-continued

Example Pseudo Code for Packet Timing Information

```
        endif
      endif
    endif
  endif
endfor
```

As shown in Table 2, for ICMP or ARP packets, a request can cause the agent on the switch to store a current time for the packet. When the response comes back, the switch can capture that time as well. The switch can then calculate the time difference between the request and response, and return the result as the RTT for the slice ID.

The manner in which the switch calculates RTT can vary for different packet types. In more detail, for each packet P, protocol type ("protoType") is checked. For ICMP, if a packet is part of a request (e.g., "isRequest" is true), then the switch can store the slice ID, source IP address ("sip"), destination IP address ("dip"), and the current time. If the ICMP packet is a return, then the switch can determine a difference in the current time versus the previously stored time. This value can represent RTT, and can be updated for the slice ID, sip, and dip. The RTT value can be sent to the monitoring module, in an example.

For an ARP packet, if a request is recognized (e.g., "isRequest" is true), then a current time for the packet is stored in association with the slice ID and source MAC address ("smac"). If the ARP packet is not a request, this can mean it is the response. In that case, a response can cause the agent to update the stored information with a round-trip time ("RTT"). This can be reported as timing information for the slice to the monitoring module.

For a TCP packet, the agent can calculate RTT based on a time difference between a forwarding flow packet and a return packet. A forwarding flow can be created, for example, when a user opens the video and the flow is going out to the destination where the video is accessed. The video can then come back from the destination, including a return packet.

In more detail, the agent can first try to determine if the packet corresponds to a forwarding flow ("forFlow") by looking in a table of recent flows. The table can store recent flows based on source IP address ("sip"), destination IP address ("dip"), source port ("sip"), and destination port ("dport"). Based on this information, the agent can look at the flow table to see if the flow has already been identified and stored with a timestamp from the forwarding flow. If a forwarding flow is recognized (e.g., "forFlow is valid"), then the current packet is the agent can get a time stamp for that forwarding flow ("forFlow→timeStamp"). The agent can also get the current time ("getTime( )") and deduct the time stamp to determine RTT. Using this value, the agent can update the RTT for the slice (e.g., "updateSliceRtt(sliceID, rtt)").

The agent can then clean up the forwarding flow such that a new time stamp will be taken for determining RTT in the future. This can include removing the forwarding flow ("forFlow") from the flow table in an example. In another example, a value is set in the flow table to indicate that RTT has already been calculated for the forwarding flow. This can cause "forFlow" to be invalid on a future lookup for that flow, which can cause the creating of another timestamp for the flow in the flow table when RTT is measured in the future.

When the monitoring module wishes to measure RTT using a TCP packet, it can set a flag in the packet header that is recognized by the agent on the switch. The agent can log forwarding flows based these flags set in a TCP packet, for example. This can allow for periodic RTT testing in one example. As shown in the pseudocode of Table 1, if a forwarding flow is not valid, then the packet P is checked to see if certain flags are not equal to zero. For example, an urgent flag ("URG"), SYN flag, for PSH flag can be set by an application. These flags can be used to identify a new flow, which can be added to the flow table for RTT calculation purposes.

An URG flag in the TCP header can indicate that the packet must be delivered without delay. The SYN flag can be set when a TCP connection is started between a client and server. The PSH flag can tell the client and server to push the buffered data to the application.

The switches can track these flags for purposes of calculating RTT. For example, the receiver can send a reply immediately if any of these flags are set. If none of the flags are present in a TCP packet, the receiver may buffer the incoming data and respond at a later time, making such packets inappropriate for calculating RTT. For example, if the sender sends a TCP packet with 1 byte at a time, instead of sending this one byte to the application immediately, the receiver TCP stack may store the data in a buffer. The receiver may wait for a few more packets to arrive and notify the application with a large set of data. In this way, the response can be delayed when the data is buffered. As a result, a buffered packet cannot be used to accurately calculate the latency, in an example, as buffering skews the results. By checking URG SYN, and PSH flags, the system can make sure that there is no buffering related delay present in the latency calculation.

In Table 1, "createFlow" can cause the new flow to be stored based on dip, sip, dport, and sport of the packet. The new flow ("revFlow") can be given a timestamp based on a call such as getTime( ) to retrieve the current time. Then, when a return packet is later received at the switch, the same packet information (sip, dip, sport, dport) can be used to get the flow ("forFlow"). This flow can be detected as valid, and the timestamp deducted from the current time to determine RTT.

In one example, at each hop, the respective switch can record this timing information and report it to the monitoring module for use in determining a latency.

At stage 130, the monitoring module can determine the latency value. This can include adding up the timing information of the packet from each hop on the slice to determine slice RTT, in an example. In another example, the monitoring module averages or otherwise aggregates the RTT information for the slice over a period of time. This aggregated value can be used as the slice latency value, in an example.

At stage 135, the monitoring module can compare the latency value to an SLA threshold. The monitoring module can do this for slice-specific latencies, comparing those values to slice-specific thresholds of the SLA. In one example, if the latency falls below the threshold, the monitoring module can first ensure that the latency value remains below the threshold for a period of time. This can help ensure that the slice path truly needs to change and prevent constant changes to slice paths. However, if the SLA threshold remains unmet for the duration of the threshold time period, then the monitoring module can act in changing the slice path.

When the SLA latency requirement is unmet, the monitoring module can select an alternate slice path for the slice. This can include referencing a network connectivity graph to determine another route with more suitable performance characteristics. In one example, information reported from the physical or virtual layers of the network and corresponding to other switches can be stored in the network connectivity graph. The alternate path selected by the monitoring module can include a switch that is not part of the original slice path, requiring a different physical and virtual path through the slice-based network.

At stage 140, the monitoring module can implement the alternate slice path across the new switch. This can include updating slice path information at an existing switch to route slice traffic to a third switch instead of a second switch. Appropriate VNFs can also be instantiated in the virtual layer corresponding to the third switch, in an example.

Figure 1C:
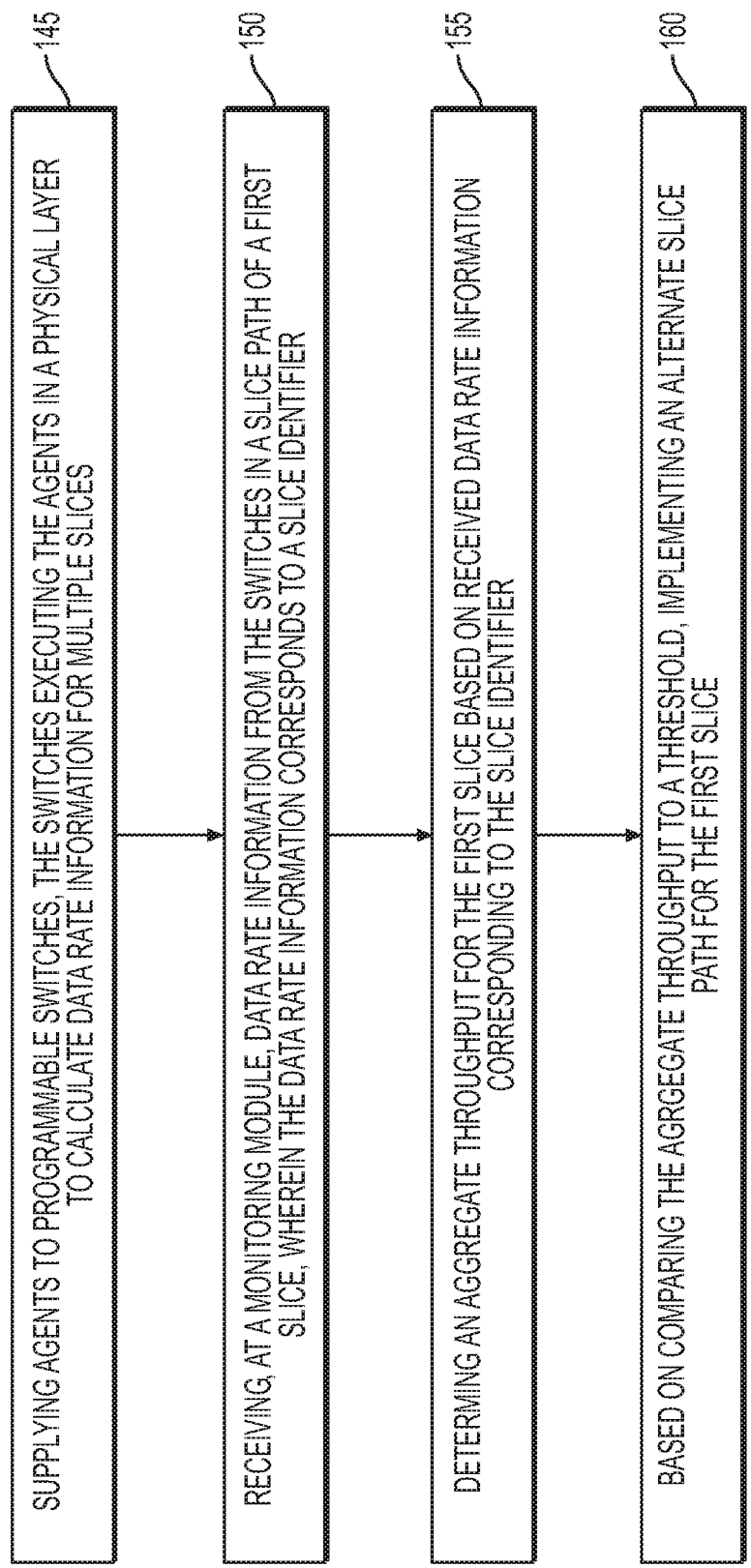

FIG. 1C illustrates an example method for reducing congestion based on throughput requirements, which can be important SLA requirements for a variety of customers. Traditional approaches to calculating throughput have including periodically sending a burst of data through the network. However, this software-based approach will not scale in a large VSN that a Telco provider can distribute across the country. Instead, the switches in the physical network can collect telematics data and the monitoring module can aggregate this data to calculate overall slice throughput.

At stage 145, the orchestrator or monitoring module can supply agents to programmable switches in the VSN. This can include causing the switches to execute the agent in the switch hardware, such as within the core of the switch. The switches, executing the agent, can then calculate data-rate information for multiple slices. In one example, the switches can maintain data-rate information in the following format: (Slice ID, Smac, Dmac, SIP, DIP, SPort, DPort, Pkt rate). Slice ID can indicate the slice. Smac can indicate the source MAC address while Dmac indicates the destination MAC address. SIP and DIP can correspond to source IP address and destination IP address, respectively. SPort and DPort can correspond to source and destination ports, and Pkt rate can indicate the packet rate.

At stage 150, the monitoring module can receive the data-rate information from multiple switches, including the switches in a current slice path for a first slice. The data-rate information can identify the slice and the packet rate. In one example, the monitoring module periodically collects this information by sending a message to the switches. In another example, the switches contact the monitoring module periodically without needing to receive a request from the monitoring module.

At stage 155, the monitoring module can determine an aggregate throughput for the slice and other slices in the VSN. This can include using the network topology and slice paths to eliminate duplicate information. For example, when a switch is not a beginning node for a flow, it can include duplicate information. The monitoring module can loop through flows to update slice throughput based on rate information from the first switch of each flow. This is explained in further detail with regard to FIG. 5, below. The other rate information can be ignored, in an example.

At stage 160, based on comparing the aggregate throughput to a threshold, the monitoring module can implement a new slice path for the slice. The threshold can be a throughput threshold for the slice in an SLA. As with latency, the monitoring module can make sure the throughput fails to comply with the SLA over a period of time, in an example, before changing the slice path. The orchestrator or monitoring module can select and implement an alternate slice path, as was discussed above. The monitoring module can pick a path that includes switches that are not suffering from low throughput. This can allow for distributing slices throughout the VSN in order to maintain SLA compliance.

Figure 2A:
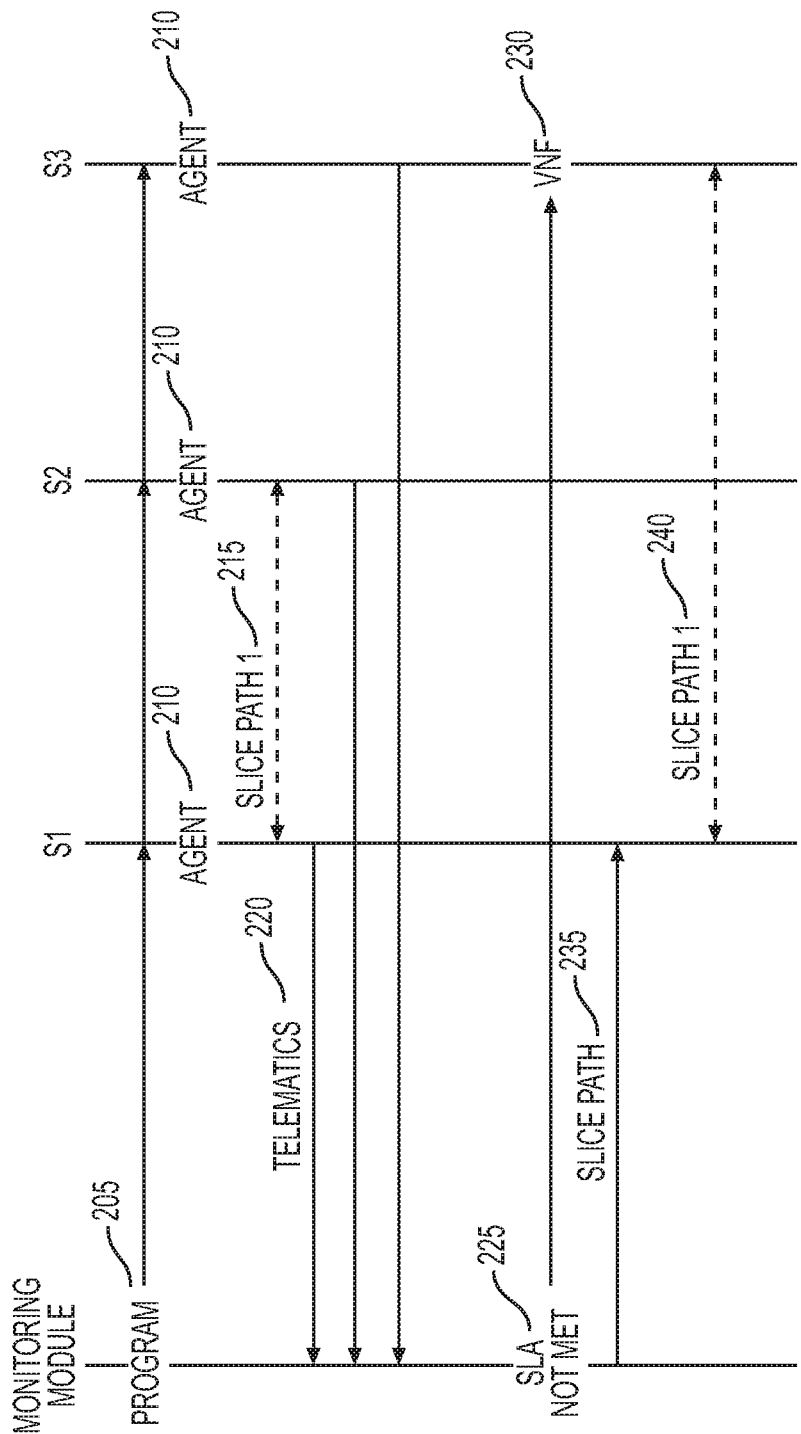
FIG. 2A is an example sequence diagram for reducing congestion for a slice in a VSN.

FIG. 2A is an example sequence diagram for reducing congestion based on telematics data. At stage 205, the monitoring module can program several switches S1, S2, S3 in the slice-based network. This can include remotely contacting an interface on the switch and sending a package for execution at the switch. The package can contain the agent. In one example, P4 language scripts are used to launch the agent on the switches. Additionally, slice paths and other information can be sent to the switches for use in routing.

At stage 210, the agent can execute on the switches. The agent can be used to collect telematics data, such as latency information or data-rate information, on a per-slice basis. The agent 210 can further include logic for looking up slice paths to determine next hops for packets based on slice ID. In this example, a slice can have a current slice path that includes switches S1 and S2. For that slice, the next hop from S1 can be S2.

At stage 220, the switches can periodically send telematics data to the monitoring module. In one example, the switches determine when to send the telematics data based on the agent. In another example, the monitoring module contacts individual switches to request the telematics data on an as-needed basis.

At stage 225, the monitoring module aggregates the telematics data per slice and can determine that a slice does not meet one or more performance requirements of the SLA. This can be based on any performance metric, and latency and throughput are just two examples. The monitoring module can then determine an alternate slice path. This can include analyzing a network topology graph that reveals other less burdened switches. In this example, a third switch S3 can have less congestion than a second switch S2.

In response, at stages 230 and 235, the monitoring module can implement a new slice path for the slice by changing the path to include the third switch S3 and exclude the second switch S2. At stage 230, the monitoring module can ensure that an appropriate VNF for the slice is running in the virtual layer corresponding to the third switch S3. Once the slice patch changes, the VNF in the virtual layer corresponding to the second switch S2 will no longer be used by that slice. In one example, VNF placement is handled by the orchestrator or some other orchestrator process besides the monitoring module.

At stage 235, the monitoring module can notify a first switch S1 of the new slice path. This can be done after the VNF from stage 230 is ready, in an example. The notification can cause switch S1 to change the next hop to S3 for that particular slice, resulting in a new slice path at stage 240. This can reduce congestions across the slice-based network.

Figure 2B:
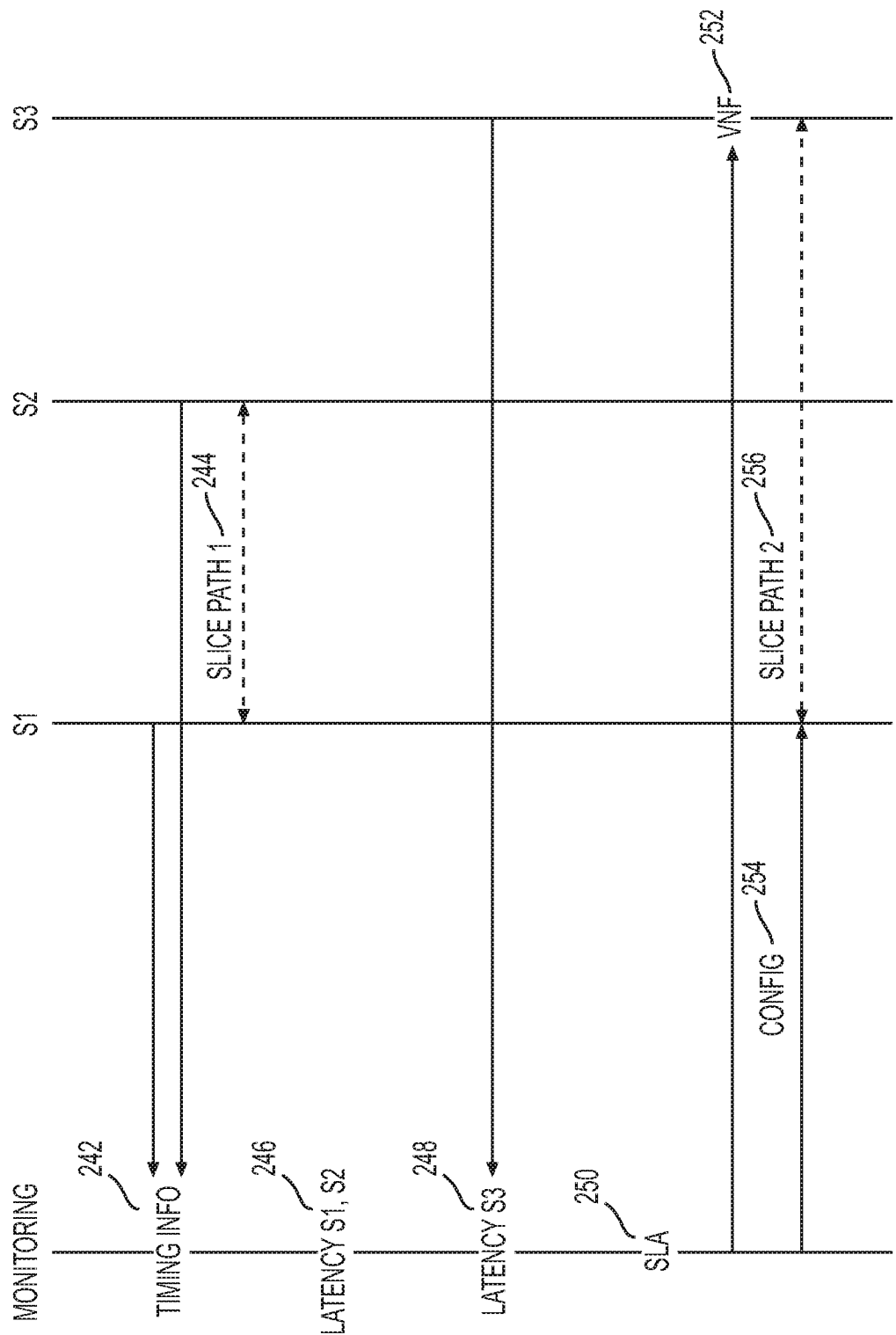
FIG. 2B is an example sequence diagram for reducing congestion for a slice in a VSN, based on latency.

FIG. 2B is an example sequence diagram for reducing congestion based on slice latency. At stage 242, the monitoring module can receive timing information from switches in the slice-based network. The agents on the switches can communicate this information to the monitoring module, as has been described. At stage 244, a first slice path can include switches S1 and S2. Both of those switches can report timing information at stage 242.

At stage 246, the monitoring module can determine a latency value for a first slice based on the timing information received from switches S1 and S2. At stage 248 the monitoring module can determine a latency value for a different slice that utilizes switch S3, based on timing information from switch S3.

At stage 250, a comparison with SLA thresholds can reveal that latency is too high in the first slice. In response, the monitoring module can change the slice path to a second slice path for the first slice at stage 256. To do this, one or more needed VNFs can be instantiated in the virtual layer of switch S3 at stage 252. Additionally, configuration information can be sent to switch S1 to change the next hop for the first slice to switch S3. This can cause the first slice to no longer use switch S2, relieving the congestion at that switch.

Figure 2C:
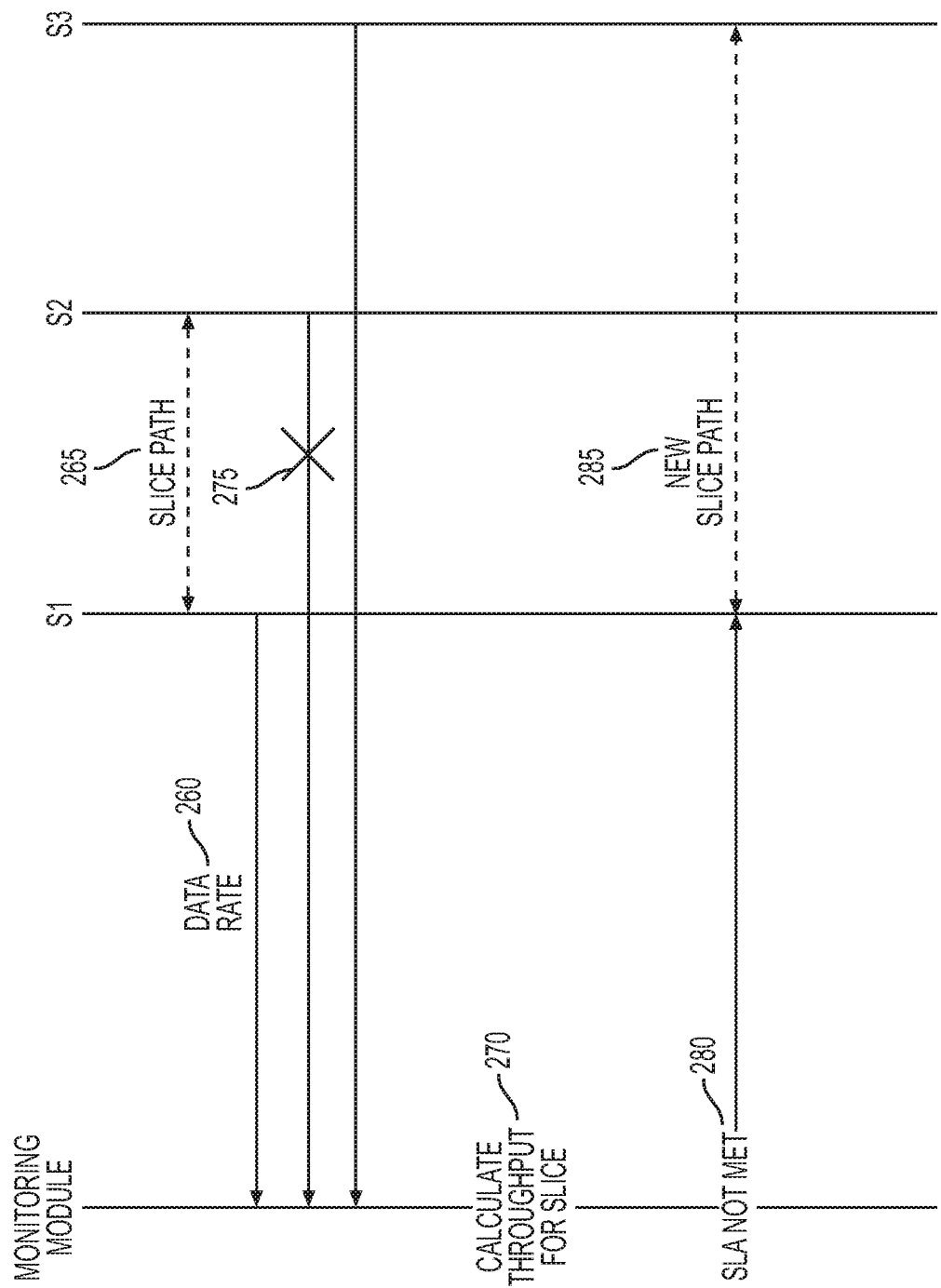
FIG. 2C is an example sequence diagram for reducing congestion for a slice in a VSN, based on throughput.

FIG. 2C is an example sequence diagram for reducing congestion based on slice throughput. A first slice can have a current slice path that includes switches S1 and S2 at stage 265. Agents on the switches can collect data-rate information on a per-slice basis. At stage 260, the switches can report slice-specific data-rate information to the monitoring module.

At stage 270, the monitoring module can calculate slice throughput. The monitoring module can do this for the first slice and other slices in the network. This can include ignoring duplicate data-rate information at stage 275. In this example, switch S2 reports duplicate data-rate information for the first slice, which has a flow that starts at switch S1 but not at switch S2. In some examples, only some of the data-rate information provided by switch S2 is duplicative of the data-rate information received from switch S1, such as where switch S2 receives data from multiple switches including S1. In those examples, stage 275 can include ignoring only the duplicate data-rate information that was already accounted for based on the data-rate information associated with switch S1. Further description is provided by FIG. 5 and the associated discussion.

At stage 280, the monitoring module can determine that the throughput of the first slice is lower than the SLA requirement. In response, a new slice path for the first slice can be implemented at stage 285. This can increase throughput by using switch S3 instead of switch S2.

Figure 3:
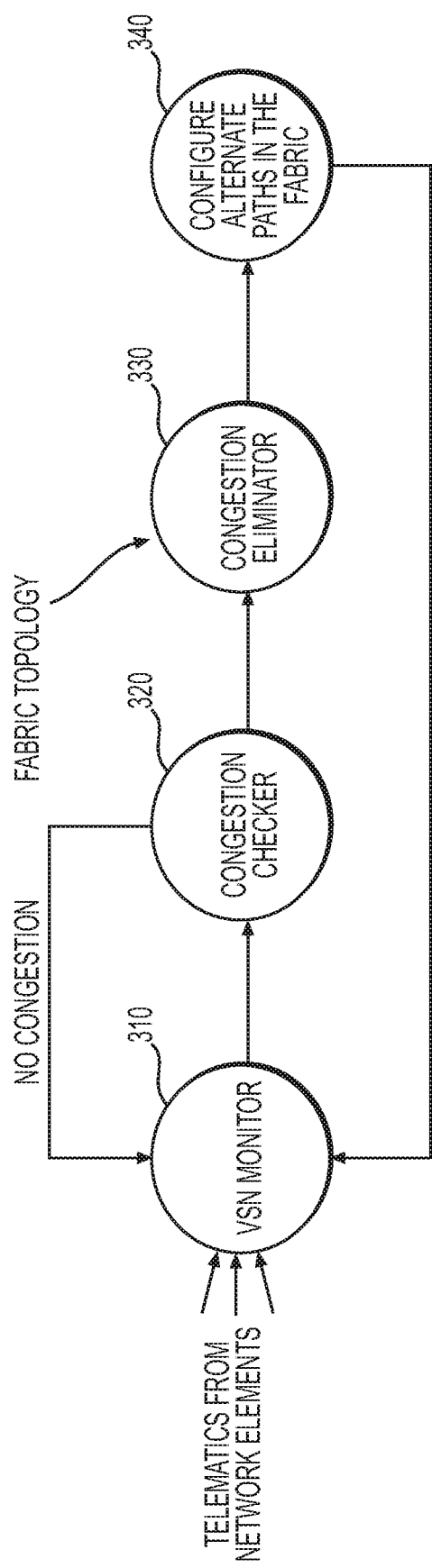
FIG. 3 is an example flowchart for congestion reduction in a slice-based network.

FIG. 3 is an example flowchart for congestion reduction in a slice-based network. The stages can be performed by a monitoring module, in an example. At stage 310, a VSN monitor receives telematics data from network elements. This can include receiving any performance data from any switches in the network, including routers, servers, and hosts. The VSN monitor can be one or more processes executing on a physical server. The server can be part of a management cluster that manages various operations on the slice-based network. In one example, the VSN monitor includes a virtual analytics engine, such as VMware®'s vRealize®, to monitor how VNFs (e.g., virtual machines) are performing in the VSN. The VNFs can represent virtual controllers, virtual routers, virtual interfaces, virtual local area networks ("VLANs"), host virtual machines ("VMs"), or other virtualized network functions that run on top of the physical hardware, such as servers connected by switches. In one example, the VSN monitor can also include a physical analytics engine, which can act as a physical underlay that analyzes performance of hardware in the network, such as the switches. The monitoring module can include the physical analytics engine. In another example, the monitoring module can include the entire analytics engine.

The physical analytics engine can include a congestion checker process that utilizes performance information (e.g., telematics data) from the physical layer. At stage 320, the congestion checker process can determine if any of the telematics data indicates congestion. Congestion can be based on performance data failing to meet a threshold. For example, bandwidth, RTT, latency, or throughput for a particular slice can be below an SLA threshold.

At stage 330, a congestion eliminator process can access fabric topology of the slice-based network to determine an alternate slice path. The fabric topology can include a graph of other available switches and associated performance metrics. The hardware in the VSN can report which VNFs are running on which devices and which switches are in communication with one another. By discovering both the hardware and virtual components, the system can map these together to create the fabric topology.

The congestion eliminator can determine one or more alternate slice paths based on the rest of the fabric topology and its current performance. Performance can be reported in the physical layer by the programmable switches that execute agents. Switches can report performance information, such as data rate, throughput, latency, and bandwidth. This performance information can be used to detect congestion.

Congestion avoidance based on performance data from the physical layer can be one reason for changing a slice path. Issues in the virtual layer can also contribute to that decision. Virtual components can separately report performance to the virtual analytics engine. In one example, both the virtual and physical layers are analyzed to determine when to change a slice path.

In one example, an orchestration process can manage a controller hierarchy. The controller hierarchy configures various entities within the one or more datacenters to implement a virtual service network. A high-level VSN controller can coordinate sets of other controllers that configure the entities in the datacenters in which the VSN is implemented. In some embodiments, each datacenter has its own suite of lower-level controllers. These controllers can include compute controllers (e.g., for configuring VMs that implement the VNFs), network controllers (e.g., for configuring forwarding switches to transmit data messages between the slice selector(s) and the network services), storage controllers, and software-defined network ("SDN") controllers (e.g., for configuring the slice selectors and/or gateways that transmit data messages between the datacenters).

At stage 340, a process can configure an alternate slice path in the network. The VSN controller hierarchy can work together to implement the new slice path. This can include instantiation of VNFs in the virtual layer and reconfiguring physical or virtual switches to contact new switches in either the virtual or physical layer. An orchestrator process can manage the VNF instantiation based on the network topology. The monitoring module can send a message to one or more switches to change the slice path. Subsequently, the new slice path can be monitored with future telematics data.

Figure 4A:
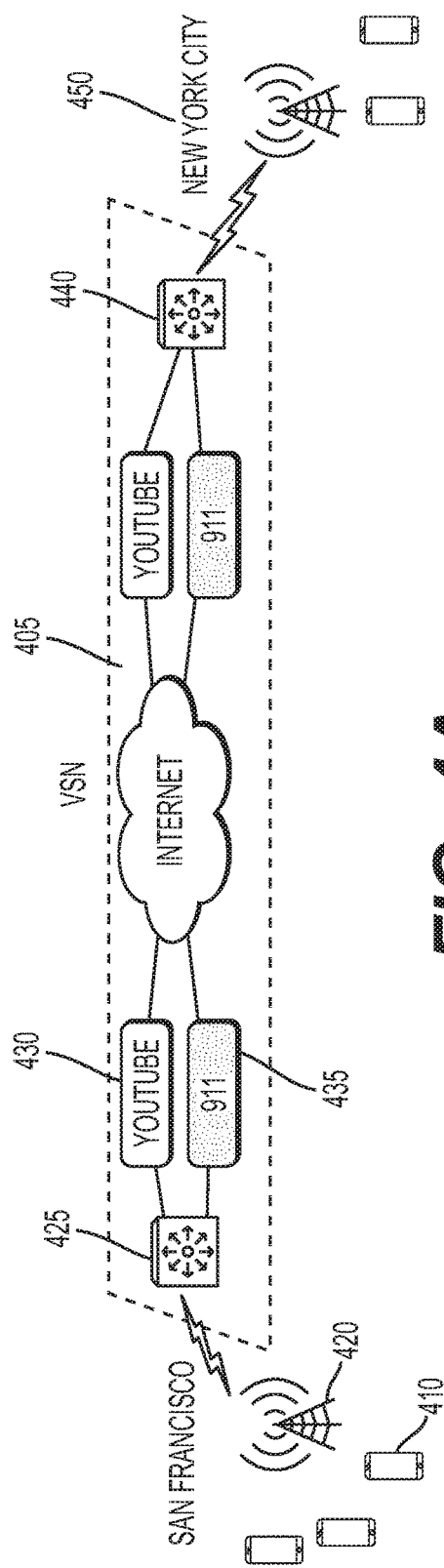
FIG. 4A is an example system diagram illustrating multiple slices in a VSN.

FIG. 4A is an example system diagram illustrating multiple slices in a VSN. Multiple end devices 410, phones in this example, can communicate with the VSN 405 by sending and receiving network data at a cell tower in San Francisco 420.

The cell tower can be communicatively coupled to a slice selector 425 that determines the correct slices for the packets coming from the end devices 410. This can be done based on packet information, such as packet type, source and destination IP address, source and destination ports, and source and destination MAC addresses. In one example, the slice selector 425 initially processes the packets and assigns them to one of the network slices of the VSN. The slice selector 425 can also handle service chaining operations to ensure that the packets processed by the correct set of network services for the assigned slice. In various examples, the slice selector 425 can be implemented by a VM, a software forwarding element (e.g., a flow-based forwarding element) operating within a VM or within virtualization software of a host computer, or a set of modules executing outside of a forwarding element (e.g., between a VM and a port of a forwarding element) within virtualization software of a host computer, among others.

In some cases, many slice selectors 425 are configured for a VSN. In a telecommunications service provider example, a network slice selector can be configured for each cell tower, base station, or other aspect of the access network. The telecommunications service provider access network can include edge clouds for each cell tower and configure at least one slice selector 425 at each such edge cloud. In other examples (e.g., for SD-WAN traffic entirely contained within a set of connected datacenters), distributed network slice selectors are configured such that the network slice selection for a data message sent from a VM occurs at the same host computer as the source of the data message (though outside of the source VM).

In this example, a first slice 430 for YOUTUBE streaming and a second slice 435 for 911 calls exist in the VSN 405. These slices 430, 435 can each have different SLA requirements and can be spread across one or more switches in the VSN. The switches can span multiple clouds across the internet, in an example. These same slices 430, 435 can end in New York City 450. A different slice selector 440 at that point can route the network traffic to and from the slice-based network.

Figure 4B:
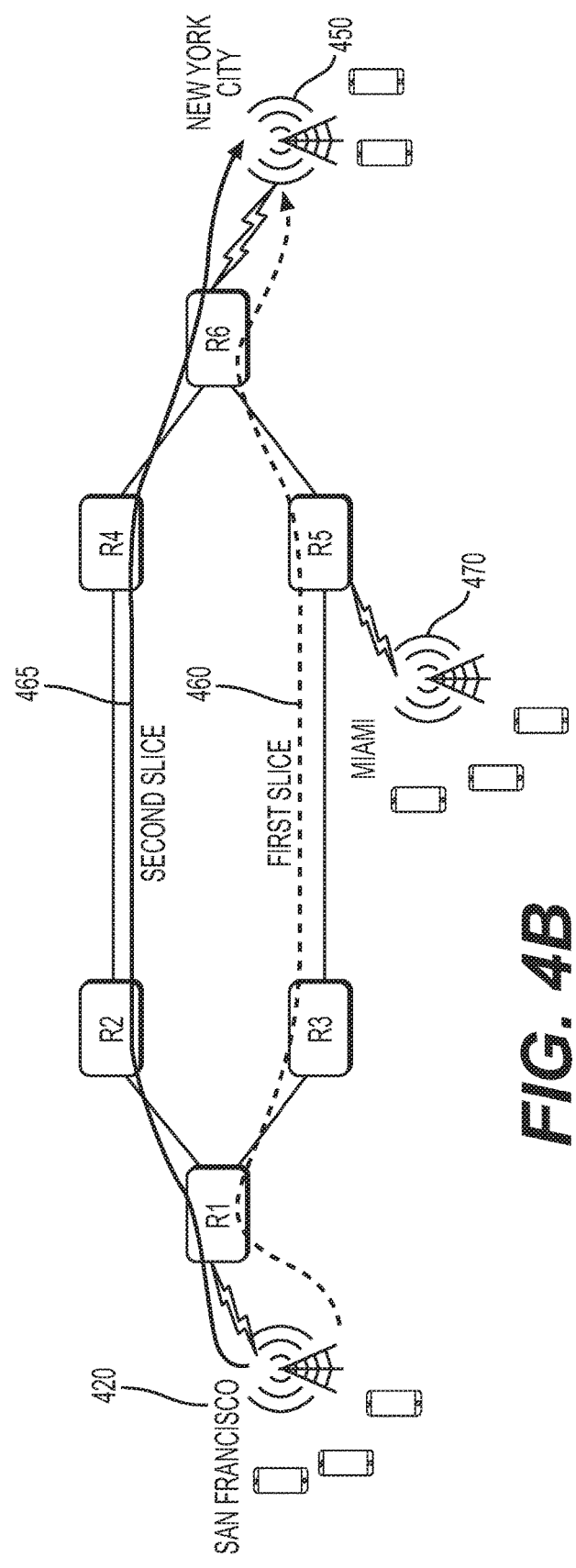
FIG. 4B is an example system diagram illustrating multiple slices in a VSN.

FIG. 4B is an example system diagram illustrating multiple slices in a VSN. A first slice 460 can span switches R1, R3, R5, and R6. A second slice 465 can span switches R1, R2, R4, and R6. Both slices 460, 465 span from San Francisco 420 to New York City 450. The switches in this example can be routers. These switches each calculate packet rate and timing information for each slice 460, 465.

In one example, the second slice originally has a slice path from San Francisco 420 to New York City 450. Based on congestion, the slice path can be changed to use switches R2, R4 instead of switch R3, R5. To do this, the monitoring module can update routing tables at switch R1 to change the next hop to switch R2 instead of switch R3. The routing tables at switches R2, R3, R4, and R5 can also be updated to reflect the new slice path.

To detect congestion, the monitoring module can use telematics data, such as the aforementioned packet rate and timing information from the various switches. Using this data, the monitoring module can attempt to aggregate throughput for each slice 460, 465. In one example, slice throughput only needs non-duplicative data-rate information for calculating total slice throughput. For example, switches R3 and R5 can have duplicate packet rate data for the first slice 460 going from San Francisco 420 to New York 450, but switch R5 will have non-duplicative and relevant packet rate data for the first slice 460 going from Miami 470 to New York 450. Therefore, while the data-rate information from switch R3 should be ignored, the Miami 470 data at switch R5 should be included in calculating throughput for the first slice 460, in an example. This is because the first slice 460 has two different sources of throughput within the same slice, the first being the flow from San Francisco 420 and the second being the flow from Miami 470. Switch R3, on the other hand, only contains the duplicate flow information from R1.

Figure 5:
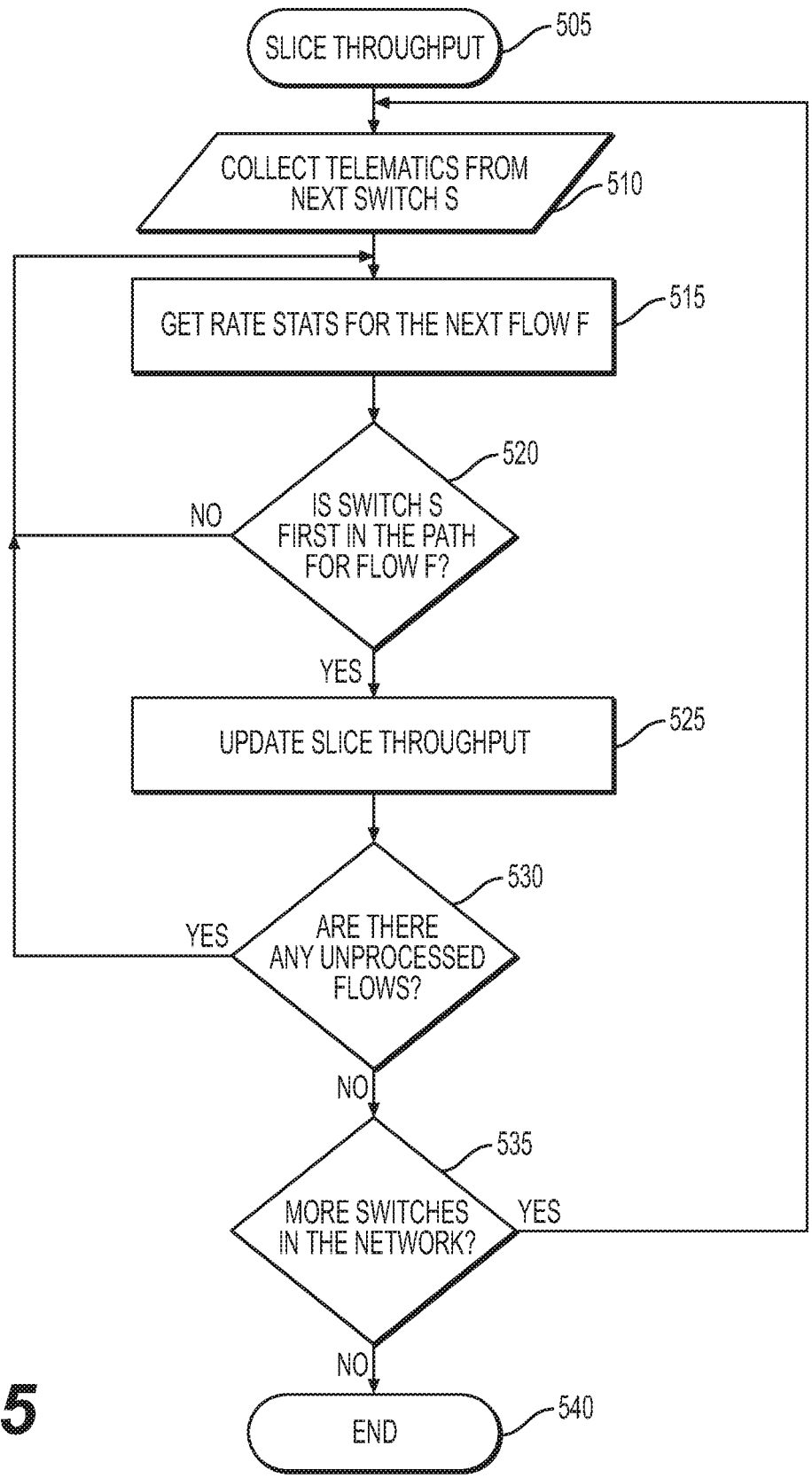
FIG. 5 is an example flow chart for calculating slice throughput.

FIG. 5 is an example flow chart for calculating slice throughput and determining how to eliminate data from duplicate flows. Other methods of calculating throughput are possible, and FIG. 5 is only one example approach. At stage 505, the monitoring module begins aggregating throughput for a slice, as explained previously. For calculating slice throughput, the data rate information is only needed from the first switch for each flow within the slice, in an example. Therefore, in one example, the monitoring module can analyze which flows begin at which switches within a slice path, and calculate throughput based on the data-rate information from those switches.

At stage 510, the monitoring module collects telematics data from a next switch S in the slice path for the slice. This can include collecting packet rate data. At stage 515, the monitoring module gets packet rate data for the next flow F.

At stage 520, if the switch is the first in the path for that flow, then the data-rate information is relevant to determining slice throughput. As a result, at stage 525, the monitoring module can update slice throughput to include the data-rate information for that flow.

If the switch is not the first path for that flow, then the data-rate information can be ignored with regard to determining slice throughput. Instead, the algorithm can get the next flow F at stage 515 again and repeat this process until there are no more flows to check at the switch. With regard to FIG. 4B, this is why switch R5 was relevant to the throughput of the first slice but switch R3 was not. At switch R3, there is a flow from San Francisco, but that flow began at switch R1. Conversely, at switch R5, a first flow began from switch R1 but a second flow began from switch R5.

At stage 530, the monitoring module determines if there are any unprocessed flows. The monitoring module can do this based on its access to the fabric topology. The fabric topology, which can be a graph, can indicate different flows based on flow paths and physical switches, in an example. If there are unprocessed flows, then the algorithm can return to stage 515, and get the rate statistics for the next flow.

Otherwise, at stage 535, the monitoring module can determine whether additional switches exist. If so, the algorithm can start again at stage 510. The next switch can be checked as the first in any flow paths and included in the slice throughput, if applicable. But if no more switches exist, slice throughput calculation is complete at stage 540.

Figure 6:
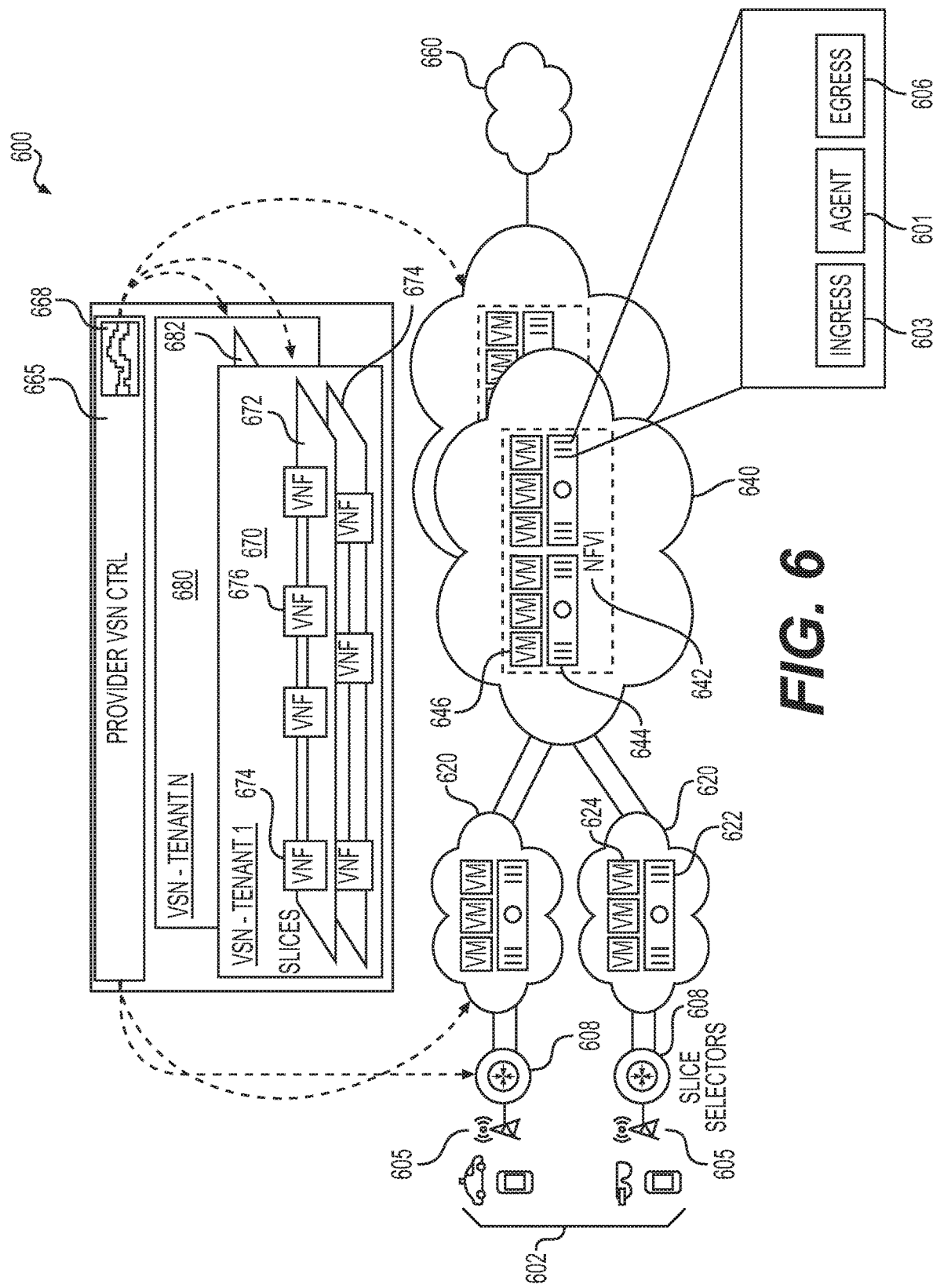
FIG. 6 is an example system diagram of a topology for a VSN.

FIG. 6 is an example diagram of system components in a VSN 600. The VSN 600 can be a distributed Telco cloud network with one or more clouds 620, 640. Slices 672, 678, 682 can be distributed across these clouds 620, 640.

Each cloud 620, 640 can have physical and virtual infrastructure for network function virtualization ("NFV") 642. For example, physical switches 644, such as routers and servers, can run VMs 646 or microservices that provide VNF functionality. A slice can include a first VNF that executes on an edge cloud 620. The VNF can utilize one or more vCPUs, which can be one or more VMs 624 in an example. However, the edge cloud 620 can execute numerous VNFs, often for multiple tenants where the VNFs are part of various slices. The slices can be kept separate from a functional perspective, with VNFs from different slices not aware of the existence of each other even when they rely on VMs 624 operating on shared physical hardware 622.

A first VNF in the slice path can communicate with a second VNF, which can be located in a different cloud 640. For example, the second VNF can include one or more VMs 646 operating on physical hardware 644 in a core cloud 640. The second VNF can communicate with yet another VNF in the slice path. One or more of these VNFs can act as an egress to the internet 660, in an example.

One or more user devices 602 can connect to a slice in the VSN 600 using, for example, a 5G data connection. The user devices 602 can be any physical processor-enabled device capable of connecting to a Telco network. Examples include cars, phones, laptops, tablets, IoT devices, virtual reality devices, and others. Cell towers 605 or other transceivers can send and receive transmissions with these user devices 602. At the ingress point to edge clouds 620, slice selectors 608 can receive data sent from the user devices 602 and determine which slice applies. The slice selectors 608 can operate as VMs 624 in the edge cloud or can run on different hardware connected to the edge cloud 620. The slice selectors can use information in the packet headers to determine which slice the packets belong to, in an example.

To manage the distributed virtual infrastructure, a provider can run a topology 665 of management processes, including an orchestrator 668 having a monitoring module. The orchestrator 668 can alternately communicate with a monitoring module that runs separately on a different server or in a different virtual environment. In that example, the monitoring module can be part of the topology 665 that works with the orchestrator 668. One example framework for these processes is VCLOUD NFV by VMWARE, which can use VSPHERE for network virtualization and VREALIZE for virtual analytics. An example orchestrator is CLOUDIFY.

The orchestrator can be responsible for managing slices and VNFs, in an example. This can include provisioning new slices or re-provisioning existing slices based on performance metrics and network load. The orchestrator can run on one or more physical servers located in one or more core clouds 620, 640 or separate from the clouds. The orchestrator 668 can provide tools for keeping track of which clouds and VNFs are included in each slice. The orchestrator can further track slice performance for individual tenants 670, 680, and provide a management console. The orchestrator 668 can also receive performance metrics and load information and determine when the monitoring module should find a new slice path.

In this example, a first tenant 670 has multiple slices 672, 674. Each slice 672, 678 can be defined by a slice record that indicates VNF requirements for that slice. VNFs 674, 676 can each provide different functionality in the service chain.

In addition, an SLA can specify various threshold performance requirements for the slices. These performance requirements can include latency, round-trip time, bandwidth, and others. These can serve as per-slice QoS requirements, in an example.

The orchestrator 668 can rely on the monitoring module to receive telematics information from the switches 622, 644 and determine if the SLA is satisfied. In one example, the monitoring module provides the switches 622, 644 with an agent 601. The switches 622, 644 can be programmed to execute the agent 601. The monitoring module can also supply policing algorithms that the switch uses to move packets from ingress ports 603 to egress ports 606, and from egress ports 606 to the next hop in the network 600. The monitoring module can also supply slice path information that the switches 622, 644 use to determine next hops and which egress interfaces (e.g., ports) to use for those next hops.

The orchestrator 668 can also change settings in the slice selectors 608 and switches 622, 644 to ensure traffic routes correctly down a slice path. This can include changing tables to which these devices compare packet information. For example, slice selection can be based on information in the packet header for a packet. For example, a switch or slice selector can use a combination of layer 2 to layer 4 (L2-L4) headers or by performing deep packet inspection (e.g., to classify traffic based on data in the layer 7 (L7) header. For example, slice selection can be based simply on the source device by using the source network layer (e.g., IP) address, or can be based on the type of traffic or destination network domain by looking at the L7 header. In some embodiments, the network slice selector maintains state for mapping connections to network slices so that deep packet inspection does not need to be performed on each data message of a connection. In addition, for some connections, only certain data messages contain the L7 header information required for performing the slice selection.

When performing slice selection using deep packet inspection, the initial data message for a connection may not include the L7 header information that the slice selector needs to correctly identify the slice. For example, a connection between an endpoint device (for example, a mobile device such as a smart phone or tablet, a laptop or desktop computer, an IoT device, a self-driving automobile, a smart camera belonging to a security system) and a network domain often begins with a set of connection initiation messages, such as a TCP handshake. After completion of the handshake, the device then sends, for example, an http get message that includes the network domain. Subsequent data messages sent between the device and the network domain may not include such information.

Although several examples above are discussed with regard to a physical switch, these examples can alternatively be performed at a virtual switch. Additionally, although the orchestrator, virtual management topology, and monitoring module are referred to separately, these processes can all operate together. The examples are not meant to limit which process performs which step. Instead, the monitoring module can be considered any portion of the virtual management topology that performs the described stages.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for avoiding congestion in a slice-based network, comprising:
receiving data from multiple switches for a plurality of slices;
determining, based on the data from at least first and second switches, that a service level agreement ("SLA") is not met for a slice that uses the first and second switches;
selecting an alternate slice path for the slice, the alternate path including a third switch that is not in the existing path for the slice; and
dynamically implementing the alternate slice path, including:

after selecting the alternate slice path, instantiating a virtual network function on the third switch for use with the slice; and causing the first switch to send traffic for the slice to the third switch instead of the second switch.

2. The method of claim 1, wherein the data is sent from agents installed at the switches to a remote monitoring module that selects the alternate slice path.

3. The method of claim 1, wherein the data includes latency, and wherein the alternate slice path is selected based on a monitoring module determining a latency requirement of the SLA is not met.

4. The method of claim 1, wherein the data includes throughput, and wherein the alternate slice path is selected based on a monitoring module determining a throughput requirement of the SLA is not met.

5. The method of claim 1, further comprising:
sending the agent to the multiple switches for execution, the agent determining the data by analyzing packets in the physical layer of the switch.

6. The method of claim 1, further comprising utilizing throughput information from fewer that all of the switches in the original slice path to determine slice throughput.

7. A non-transitory, computer-readable medium comprising instructions that, when executed by a processor, perform stages for avoiding congestion in a slice-based network, the stages comprising:
receiving data from multiple switches for a plurality of slices;
determining, based on the data from at least first and second switches, that a service level agreement ("SLA") is not met for a slice that uses the first and second switches;
selecting an alternate slice path for the slice, the alternate path including a third switch that is not in the existing path for the slice; and
dynamically implementing the alternate slice path, including:
after selecting the alternate slice path, instantiating a virtual network function on the third switch for use with the slice; and
causing the first switch to send traffic for the slice to the third switch instead of the second switch.

8. The non-transitory, computer-readable medium of claim 7, wherein the data is sent from agents installed at the switches to a remote monitoring module that selects the alternate slice path.

9. The non-transitory, computer-readable medium of claim 7, wherein the data includes latency, and wherein the alternate slice path is selected based on a monitoring module determining a latency requirement of the SLA is not met.

10. The non-transitory, computer-readable medium of claim 7, wherein the data includes throughput, and wherein the alternate slice path is selected based on a monitoring module determining a throughput requirement of the SLA is not met.

11. The non-transitory, computer-readable medium of claim 7, the stages further comprising:
sending the agent to the multiple switches for execution, the agent determining the data by analyzing packets in the physical layer of the switch.

12. The non-transitory, computer-readable medium of claim 7, the stages further comprising utilizing throughput information from fewer that all of the switches in the original slice path to determine slice throughput.

13. A system for avoiding congestion in a slice-based network, comprising:
a non-transitory, computer-readable medium containing instructions for a monitoring module; and
a processor that executes the monitoring module to perform stages comprising:
receiving data from multiple switches for a plurality of slices;
determining, based on the data from at least first and second switches, that a service level agreement ("SLA") is not met for a slice that uses the first and second switches;
selecting an alternate slice path for the slice, the alternate path including a third switch that is not in the existing path for the slice; and
dynamically implementing the alternate slice path, including;
after selecting the alternate slice path, instantiating a virtual network function on the third switch for use with the slice; and
causing the first switch to send traffic for the slice to the third switch instead of the second switch.

14. The system of claim 13, wherein the data is sent from agents installed at the switches to a remote monitoring module that selects the alternate slice path.

15. The system of claim 13, wherein the data includes latency, and wherein the alternate slice path is selected based on a monitoring module determining a latency requirement of the SLA is not met.

16. The system of claim 13, wherein the data includes throughput, and wherein the alternate slice path is selected based on a monitoring module determining a throughput requirement of the SLA is not met.

17. The system of claim 13, the stages further comprising:
sending the agent to the multiple switches for execution, the agent determining the data by analyzing packets in the physical layer of the switch.

18. The method of claim 1, wherein the data comprises telematics data.

19. The non-transitory, computer-readable medium of claim 7, wherein the data comprises telematics data.

20. The system of claim 13, wherein the data comprises telematics data.

* * * * *